(12) United States Patent
Gao et al.

(10) Patent No.: US 11,088,904 B2
(45) Date of Patent: *Aug. 10, 2021

(54) METHODS AND APPARATUSES FOR REFERENCE SIGNAL CONFIGURATION

(71) Applicant: NEC CORPORATION, Tokyo (JP)

(72) Inventors: Yukai Gao, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/802,093

(22) Filed: Feb. 26, 2020

(65) Prior Publication Data

US 2020/0204437 A1 Jun. 25, 2020

Related U.S. Application Data

(63) Continuation of application No. 16/581,828, filed on Sep. 25, 2019, now Pat. No. 10,616,051, which is a continuation of application No. PCT/CN2017/088076, filed on Jun. 13, 2017.

(51) Int. Cl.
| | |
|---|---|
| *H04L 12/24* | (2006.01) |
| *H04W 76/27* | (2018.01) |
| *H04L 5/00* | (2006.01) |
| *H04W 72/04* | (2009.01) |

(52) U.S. Cl.
CPC ........ *H04L 41/0806* (2013.01); *H04L 5/0048* (2013.01); *H04W 72/042* (2013.01); *H04W 76/27* (2018.02)

(58) Field of Classification Search
None
See application file for complete search history.

(56) References Cited

U.S. PATENT DOCUMENTS

| | | | |
|---|---|---|---|
| 2012/0207119 A1* | 8/2012 | Zhang | ................... H04L 5/0051 370/329 |
| 2013/0155921 A1 | 6/2013 | Gomadam et al. | |
| 2018/0183556 A1* | 6/2018 | Shin | ..................... H04L 5/0051 |
| 2018/0278395 A1 | 9/2018 | Yoon | |

(Continued)

FOREIGN PATENT DOCUMENTS

| | | |
|---|---|---|
| CN | 102076026 A | 5/2011 |
| CN | 102334300 A | 1/2012 |

(Continued)

OTHER PUBLICATIONS

Qualcomm et al., "WF on Front-load DMRS design", 3GPP TSG RAN WG1 Meeting #89, R1-1709833, May 15-19, 2017, (2 pages total).

(Continued)

*Primary Examiner* — Rebecca E Song
(74) *Attorney, Agent, or Firm* — Sughrue Mion, PLLC

(57) ABSTRACT

Embodiments of the present disclosure relate to methods and devices for reference signal (RS) transmission. In example embodiments, a method implemented in a network device is provided. According to the method, the size of a field for indicating a RS configuration to a terminal device served by the network device is determined based on at least one condition related to RS transmission. A first indication of the RS configuration is transmitted to the terminal device. The first indication is included in the field with the determined size.

20 Claims, 12 Drawing Sheets

(56) References Cited

U.S. PATENT DOCUMENTS

| | | | |
|---|---|---|---|
| 2018/0332572 A1 | 11/2018 | Liu | |
| 2019/0013916 A1* | 1/2019 | Jin | H04L 1/16 |
| 2019/0158206 A1* | 5/2019 | Li | H04J 13/0048 |
| 2019/0253300 A1 | 8/2019 | Munier | |
| 2019/0312703 A1 | 10/2019 | Xie | |
| 2019/0356446 A1* | 11/2019 | Kim | H04L 5/0053 |

FOREIGN PATENT DOCUMENTS

| | | |
|---|---|---|
| CN | 104980247 A | 10/2015 |
| CN | 104981022 A | 10/2015 |
| CN | 106470087 A | 3/2017 |
| WO | 2017/045104 A1 | 3/2017 |
| WO | 2018174665 A1 | 9/2018 |

OTHER PUBLICATIONS

"Remaining details on DM-RS enhancements for FD-MIMO", 3GPP TSG RAN WG1 Meeting #83, R1-157298, ITL Inc., Nov. 15-20, 2015, (4 pages total).
Communication dated May 20, 2020, from the European Patent Office in application No. 17913430.9.
Written Opinion of PCT/CN2017/088076 dated Feb. 24, 2018 [PCT/ISA/237].
International Search Report of PCT/CN2017/088076 dated Feb. 24, 2018 [PCT/ISA/210].
Samsung, "Overview on performance requirements of Rel-14 eFD-MIMO", 3GPP TSG-RAN WG4 Meeting #82bis, R4-1704776, Apr. 3-7, 2017, pp. 1-4 (total 4 pages).
Nokia et al., "Remaining issues of UL IFDMA DMRS", 3GPP TSG RAN WG1 Meeting #87, R1-1611280, Nov. 14-18, 2016, total 6 pages.
Nokia et al., "Control Signaling Design for UL DMRS with IFDMA", 3GPP TSG RAN WG1 Meeting #86bis, R1-1608929, Oct. 10-14, 2016, total 7 pages.
Alcatel-Lucent Shanghai Bell et al., "Remaining Details of DMRS Enhancement", 3GPP TSG RAN WG1 Meeting #83, R1-156715, Nov. 15-22, 2015, total 3 pages.
CMCC, "Spec impact of additional DMRS ports", 3GPP TSG RAN WG1 Meeting #82, R1-154304, Aug. 24-28, 2015, total 5 pages.
Communication dated Jun. 16, 2020 from Japanese Patent Office in JP Application No. 2019-563529.
Communication dated Sep. 23, 2020, from the Japanese Patent Office in application No. 2019-563529.
3GPP TS 36.212 V14.2.0, "3rd Generation Partnership Project; Technical Specification Group Radio Access Network; Evolved Universal Terrestrial Radio Access (E-UTRA); Multiplexing and channel coding (Release 14)" Mar. 2017, pp. 2-43 (42 pages total).
Office Action dated May 7, 2021 in Indian Application No. 201917036534.

* cited by examiner

410

| \multicolumn{2}{c}{ONE CODEWORD AND/OR TRANSPORT BLOCK} |
|---|---|
| INDEX VALUE | MESSAGE |
| 0 | 1 layer, configuration for the index value '0' |
| 1 | 1 layer, configuration for the index value '1' |
| 2 | 1 layer, configuration for the index value '2' |
| ... | ... |
| $a_1 - 1$ | 1 layer, configuration for the index value '$a_1 - 1$' |
| $a_1$ | 2 layers, configuration for the index value '$a_1$' |
| ... | ... |
| $a_1 + a_2 - 1$ | 2 layers, configuration for the index value '$a_1 + a_2 - 1$' |
| $a_1 + a_2$ | 3 layers, configuration for the index value '$a_1 + a_2$' |
| ... | ... |
| $a_1 + a_2 + a_3 - 1$ | 3 layers, configuration for the index value '$a_1 + a_2 + a_3 - 1$' |
| $a_1 + a_2 + a_3$ | 4 layers, configuration for the index value '$a_1 + a_2 + a_3$' |
| ... | ... |
| $a_1 + a_2 + a_3 + a_4 - 1$ | 4 layers, configuration for the index value '$a_1 + a_2 + a_3 + a_4 - 1$' |

420

| \multicolumn{2}{c}{TWO CODEWORDS AND/OR TRANSPORT BLOCKS} |
|---|---|
| INDEX VALUE | MESSAGE |
| 0 | 5 layers, configuration for the index value '0' |
| ... | ... |
| $b_1 - 1$ | 5 layers, configuration for the index value '$b_1 - 1$' |
| $b_1$ | 6 layers, configuration for the index value '$b_1$' |
| ... | ... |
| $b_1 + b_2 - 1$ | 6 layers, configuration for index value '$b_1 + b_2 - 1$' |
| $b_1 + b_2$ | 7 layers, configuration for index value '$b_1 + b_2$' |
| ... | ... |
| $b_1 + b_2 + b_3 - 1$ | 7 layers, configuration for index value '$b_1 + b_2 + b_3 - 1$' |
| $b_1 + b_2 + b_3$ | 8 layers, configuration for index value '$b_1 + b_2 + b_3$' |
| ... | ... |
| $b_1 + b_2 + b_3 + b_4 - 1$ | 8 layers, configuration for index value '$b_1 + b_2 + b_3 + b_4 - 1$' |

| ONE CODEWORD AND/OR TRANSPORT BLOCK ||
|---|---|
| INDEX VALUE | MESSAGE |
| 0 | 1 layer, port A |
| 1 | 1 layer, port B |
| 2 | 1 layer, port C |
| 3 | 1 layer, port D |
| 4 | 1 layer, port E |
| 5 | 1 layer, port F |
| 6 | 1 layer, port G |
| 7 | 1 layer, port H |
| 8 | 2 layers, ports A, B |
| 9 | 2 layers, ports C, D |
| 10 | 2 layers, ports E, F |
| 11 | 2 layers, ports G, H |
| 12 | 3 layers, ports A, B, C |
| 13 | 3 layers, ports E, F, G |
| 14 | 4 layers, ports A, B, C, D |
| 15 | 4 layers, ports E, F, G, H |

520

| TWO CODEWORDS AND/OR TRANSPORT BLOCKS ||
|---|---|
| INDEX VALUE | MESSAGE |
| 0 | 5 layers, ports A, B, C, D, E |
| 1 | 6 layers, ports A, B, C, D, E, F |
| 2 | 7 layers, ports A, B, C, D, E, F, G |
| 3 | 8 layers, ports A, B, C, D, E, F, G, H |

| ONE CODEWORD AND/OR TRANSPORT BLOCK ||
|---|---|
| INDEX VALUE | MESSAGE |
| 0 | 1 layer, port A |
| 1 | 1 layer, port B |
| 2 | 1 layer, port C |
| 3 | 1 layer, port D |
| 4 | 1 layer, port E |
| 5 | 1 layer, port F |
| 6 | 1 layer, port G |
| 7 | 1 layer, port H |
| 8 | 1 layer, port I |
| 9 | 1 layer, port J |
| 10 | 1 layer, port K |
| 11 | 1 layer, port L |
| 12 | 2 layers, ports A, B |
| 13 | 2 layers, ports C, D |
| 14 | 2 layers, ports E, F |
| 15 | 2 layers, ports G, H |
| 16 | 2 layers, ports I, J |
| 17 | 2 layers, ports K, L |
| 18 | 3 layers, ports A, B, C |
| 19 | 3 layers, ports D, E, F |
| 20 | 3 layers, ports G, H, I |
| 21 | 3 layers, ports J, K, L |
| 22 | 4 layers, ports A, B, C, D |
| 23 | 4 layers, ports E, F, G, H |
| 24 | 4 layers, ports I, J, K, L |

540 →

| TWO CODEWORDS AND/OR TRANSPORT BLOCKS ||
|---|---|
| INDEX VALUE | MESSAGE |
| 0 | 5 layers, ports A, B, C, D, E |
| 1 | 5 layers, ports G, H, I, J, K |
| 2 | 6 layers, ports A, B, C, D, E, F |
| 3 | 6 layers, ports G, H, I, J, K, L |
| 4 | 7 layers, ports A, B, C, E, F, G, H / 7 layers, ports A, B, C, G, H, I, J |
| 5 | 8 layers, ports A, B, C, D, E, F, G, H |

| ONE CODEWORD AND/OR TRANSPORT BLOCK | | TWO CODEWORDS AND/OR TRANSPORT BLOCKS | |
| --- | --- | --- | --- |
| INDEX VALUE | MESSAGE | INDEX VALUE | MESSAGE |
| 0 | 1 layer, port A | 0 | 5 layers, ports A, B, C, D, E |
| 1 | 1 layer, port B | 1 | 5 layers, ports G, H, I, J, K |
| 2 | 1 layer, port C | 2 | 6 layers, ports A, B, C, D, E, F |
| 3 | 1 layer, port D | 3 | 6 layers, ports G, H, I, J, K, L |
| 4 | 1 layer, port E | 4 | 7 layers, ports A, B, C, E, F, G, H |
| 5 | 1 layer, port F | 5 | 8 layers, ports A, B, C, D, E, F, G, H |
| 6 | 1 layer, port G | | |
| 7 | 1 layer, port H | | |
| 8 | 1 layer, port I | | |
| 9 | 1 layer, port J | | |
| 10 | 1 layer, port K | | |
| 11 | 1 layer, port L | | |
| 12 | 2 layers, ports A, B | | |
| 13 | 2 layers, ports C, D | | |
| 14 | 2 layers, ports E, F | | |
| 15 | 2 layers, ports G, H | | |
| 16 | 2 layers, ports I, J | | |
| 17 | 2 layers, ports K, L | | |
| 18 | 3 layers, ports A, B, C | | |
| 19 | 3 layers, ports D, E, F | | |
| 20 | 3 layers, ports G, H, I | | |
| 21 | 3 layers, ports J, K, L | | |
| 22 | 4 layers, ports A, B, C, D | | |
| 23 | 4 layers, ports E, F, G, H | | |
| 24 | 4 layers, ports I, J, K, L | | |

| ONE CODEWORD AND/OR TRANSPORT BLOCK | | TWO CODEWORDS AND/OR TRANSPORT BLOCKS | |
| --- | --- | --- | --- |
| INDEX VALUE | MESSAGE | INDEX VALUE | MESSAGE |
| 0 | 1 layer, port A | 0 | 5 layers, ports A, B, C, D, E |
| 1 | 1 layer, port B | 1 | 5 layers, ports G, H, I, J, K |
| 2 | 1 layer, port C | 2 | 6 layers, ports A, B, C, D, E, F |
| 3 | 1 layer, port D | 3 | 6 layers, ports G, H, I, J, K, L |
| 4 | 1 layer, port E | 4 | 7 layers, ports A, B, C, E, F, G, H |
| 5 | 1 layer, port F | 5 | 8 layers, ports A, B, C, D, E, F, G, H |
| 6 | 1 layer, port G | 6 | 2 layers, ports I, J |
| 7 | 1 layer, port H | 7 | 2 layers, ports K, L |
| 8 | 1 layer, port I | 8 | 3 layers, ports A, B, C |
| 9 | 1 layer, port J | 9 | 3 layers, ports D, E, F |
| 10 | 1 layer, port K | 10 | 3 layers, ports G, H, I |
| 11 | 1 layer, port L | 11 | 3 layers, ports J, K, L |
| 12 | 2 layers, ports A, B | 12 | 4 layers, ports A, B, C, D |
| 13 | 2 layers, ports C, D | 13 | 4 layers, ports E, F, G, H |
| 14 | 2 layers, ports E, F | 14 | 4 layers, ports I, J, K, L |
| 15 | 2 layers, ports G, H | | |
| 16 | 2 layers, ports I, J | | |
| 17 | 2 layers, ports K, L | | |
| 18 | 3 layers, ports A, B, C | | |
| 19 | 3 layers, ports D, E, F | | |
| 20 | 3 layers, ports G, H, I | | |
| 21 | 3 layers, ports J, K, L | | |
| 22 | 4 layers, ports A, B, C, D | | |
| 23 | 4 layers, ports E, F, G, H | | |
| 24 | 4 layers, ports I, J, K, L | | |

Fig. 6B

METHODS AND APPARATUSES FOR REFERENCE SIGNAL CONFIGURATION

CROSS REFERENCE TO RELATED APPLICATIONS

This application is a continuation of U.S. application Ser. No. 16/581,828, filed Sep. 25, 2019, which is continuation of International Application No. PCT/CN2017/088076, filed Jun. 13, 2017.

TECHNICAL FIELD

Embodiments of the present disclosure generally relate to the field of telecommunication, and in particular, to methods and apparatuses for reference signal (RS) configuration.

BACKGROUND

With the development of communication technologies, multiple types of services or traffic have been proposed, for example, enhanced mobile broadband (eMBB) generally requiring high data rate, massive machine type communication (mMTC) typically requiring long battery lifetime, and ultra-reliable and low latency communication (URLLC). Meanwhile, multi-antenna schemes, such as beam management, reference signal transmission, and so on, are studied for new radio access.

Conventionally, a network device (for example, an eNB or a gNB) transmits downlink reference signals (RSs) such as Demodulation Reference Signal (DMRS), Channel State Information-Reference Signal (CSI-RS), Sounding Reference Signal (SRS), and the like. A terminal device (for example, a user equipment) in the system may receive the downlink RSs on allocated resources. The terminal device may also transmit uplink RSs to the network device on corresponding allocated resources. For indicating the allocated resources for the RSs, the network device may transmit RS configurations to the terminal device prior to the transmissions of the RSs.

For example, two configuration patterns for DMRS have been designed and agreed in 3GPP specification works, each of which may support up to 8 or 12 orthogonal DMRS ports. This may result in a relatively large overhead for a network device to indicate a DMRS configuration to a terminal device. In this case, an overhead reduction scheme for DMRS configuration needs to be considered.

SUMMARY

In general, example embodiments of the present disclosure provide methods and apparatuses for RS configuration.

In a first aspect, there is provided a method implemented in a network device. According to the method, the size of a field for indicating a reference signal (RS) configuration to a terminal device served by the network device is determined based on at least one condition related to RS transmission. A first indication of the RS configuration is transmitted to the terminal device. The first indication is included in the field with the determined size.

In a second aspect, there is provided a method implemented in a terminal device. According to the method, the size of a field for indicating a reference signal (RS) configuration to a terminal device served by the network device is determined based on at least one condition related to RS transmission. A first indication of the RS configuration is received from the network device. The first indication is included in the field with the determined size.

In a third aspect, there is provided a network device. The network device comprises a processor and a memory coupled to the processor. The memory stores instructions that when executed by the processor, cause the network device to performs actions. The actions comprise: determining, based on at least one condition related to reference signal (RS) transmission, the size of a field for indicating a RS configuration to a terminal device served by the network device; and transmitting to the terminal device a first indication of the RS configuration, the first indication being included in the field with the determined size.

In a fourth aspect, there is provided a terminal device. The terminal device comprises a processor and a memory coupled to the processor. The memory stores instructions that when executed by the processor, cause the network device to performs actions. The actions comprise: determining, based on at least one condition related to reference signal (RS) transmission, the size of a field for indicating a RS configuration by a network device serving the terminal device; and receiving, from the network device, a first indication of the RS configuration, the first indication being included in the field with the determined size.

Other features of the present disclosure will become easily comprehensible through the following description.

BRIEF DESCRIPTION OF THE DRAWINGS

Through the more detailed description of some embodiments of the present disclosure in the accompanying drawings, the above and other objects, features and advantages of the present disclosure will become more apparent, wherein:

FIG. 4 shows examples of possible DMRS configurations according to some embodiments of the present disclosure;

FIG. 5A-5B shows examples of possible DMRS configurations according to some embodiments of the present disclosure;

FIG. 6A-6B shows examples of possible DMRS configurations according to some embodiments of the present disclosure;

Throughout the drawings, the same or similar reference numerals represent the same or similar element.

DETAILED DESCRIPTION

Figure 1:
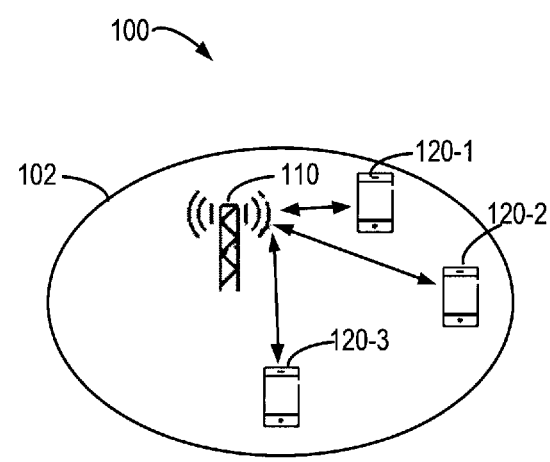
FIG. 1 is a block diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" or "base station" (BS) refers to a device which is capable of providing or hosting a cell or coverage where terminal devices can communicate. Examples of a network device include, but not limited to, a Node B (NodeB or NB), an Evolved NodeB (eNodeB or eNB), a next generation NodeB (gNB) a Remote Radio Unit (RRU), a radio head (RH), a remote radio head (RRH), a low power node such as a femto node, a pico node, and the like. For the purpose of discussion, in the following, some embodiments will be described with reference to gNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, image capture devices such as digital cameras, gaming devices, music storage and playback appliances, or Internet appliances enabling wireless or wired Internet access and browsing and the like. For the purpose of discussion, in the following, some embodiments will be described with reference to UE as examples of the terminal device.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "at least in part based on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

Communication discussed in the present disclosure may conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

FIG. 1 shows an example communication network 100 in which embodiments of the present disclosure can be implemented. The network 100 includes a network device 110 and three terminal devices 120-1 and 120-3 (collectively referred to as terminal devices 120 or individually referred to as terminal device 120) served by the network device 110. The coverage of the network device 110 is also called as a cell 102. It is to be understood that the number of base stations and terminal devices is only for the purpose of illustration without suggesting any limitations. The network 100 may include any suitable number of base stations and the terminal devices adapted for implementing embodiments of the present disclosure. Although not shown, it would be appreciated that there may be one or more neighboring cells adjacent to the cell 102 where one or more corresponding network devices provides service for a number of terminal device located therein.

The network device 110 may communicate with the terminal devices 120. The communications in the network 100 may conform to any suitable standards including, but not limited to, Long Term Evolution (LTE), LTE-Evolution, LTE-Advanced (LTE-A), Wideband Code Division Multiple Access (WCDMA), Code Division Multiple Access (CDMA) and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.75G, the third generation (3G), the fourth generation (4G), 4.5G, the fifth generation (5G) communication protocols.

In addition to normal data communications, the network device 110 may send a RS in a broadcast, multi-cast, and/or unicast manners to one or more of the terminal devices 120 in a downlink. Similarly, one or more of the terminal devices 120 may transmit RSs to the network device 110 in an uplink. As used herein, a "downlink" refers to a link from a network device to a terminal device, while an "uplink" refers to a link from the terminal device to the network device. For the purpose of discussion without suggesting any limitations, in the following description, some embodiments will be described with reference to the downlink RS transmission.

For example, in the case of downlink RS transmission, the RS may be used by the terminal devices 120 for beam sweeping, channel estimation, demodulation, and other operations for communication. Generally speaking, a RS is a signal sequence (also referred to as "RS sequence") that is known by both the network device 110 and the terminal devices 120. For example, a RS sequence may be generated and transmitted by the network device 110 based on a certain rule and the terminal device 120 may deduce the RS sequence based on the same rule. Examples of the RS may include but are not limited to downlink or uplink Demodulation Reference Signal (DMRS), Channel State Information-Reference Signal (CSI-RS), Sounding Reference Signal (SRS), Phase Tracking Reference Signal (PTRS) and so on. For the purpose of discussion without suggesting any limitations, in the following description, some embodiments will be described with reference to DMRS as examples of the RS.

In transmission of downlink and uplink RSs, the network device 110 may allocate corresponding resources (also referred to as "RS resources") for the transmission and/or specify which RS sequence is to be transmitted. In some scenarios, both the network device 110 and the terminal device 120 are equipped with multiple antenna ports (or antenna elements) and can transmit specified RS sequences with the antenna ports (antenna elements). A set of RS resources associated with a number of RS ports are also specified. A RS port may be referred to as a specific mapping of part or all of a RS sequence to one or more resource elements (REs) of a resource region allocated for RS transmission in time, frequency, and/or code domains. Such resource allocation information may be included in Downlink Control Information (DCI) and indicated to the terminal device 120 via Physical Downlink Control Channel (PDCCH).

As described above, two configuration patterns for DMRS have been designed and agreed in 3GPP specification works, each of which may support up to 8 or 12 orthogonal DMRS ports. However, in a current solution for DMRS configuration in LTE, only a fixed number of bits in DCI are supported for indicating the DMRS configuration (such as, antenna port(s), scrambling identity, the number of RS transmission layers and a RS configuration pattern, to be used for RS transmission), without considering different conditions.

The number of possible DMRS configurations for one codeword (CW) and that for two CWs may be quite different. For example, in the case of one CW, the possible DMRS configurations may need to cover 1 to 4 RS transmission layers. The possible DMRS configurations may also need to meet the requirements of multi-user scheduling and/or accordant retransmission, and cover different combinations of antenna port(s), scrambling identity and the number of RS transmission layers. Therefore, the number of possible DMRS configurations for one CW may be relatively large. On the other hand, in the case of two CWs, the number of RS transmission layers will be not less than 5, so the number of possible DMRS configurations will be much less than that for one CW.

However, for downlink-related DCI in LTE, no matter of one or two CWs, fixed 16 bits are reserved for indicating two sets of Modulation and Coding Scheme/New Data Indicator/Redundancy version (MCS/NDI/RV), and fixed 3 or 4 bits are reserved for indicating antenna port(s), scrambling identity and the number of layers. For uplink-related DCI in LTE, no matters of one or two CWs, fixed 12 bits are reserved for indicating MCS/NDI/RV and precoding information. That is, in the current solution for DMRS configuration in LTE, the fixed number of bits in DCI may have to cover the maximum number of possible DMRS configurations for both one CW and two CWs, which may result in a waste of bits in DCI payload.

In order to solve the problems above and one or more of other potential problems, a solution for DMRS configuration is provided in accordance with example embodiments of the present disclosure. With the solution, the payload size of Downlink Control Information for indicating the DMRS configuration can be reduced.

Figure 2:
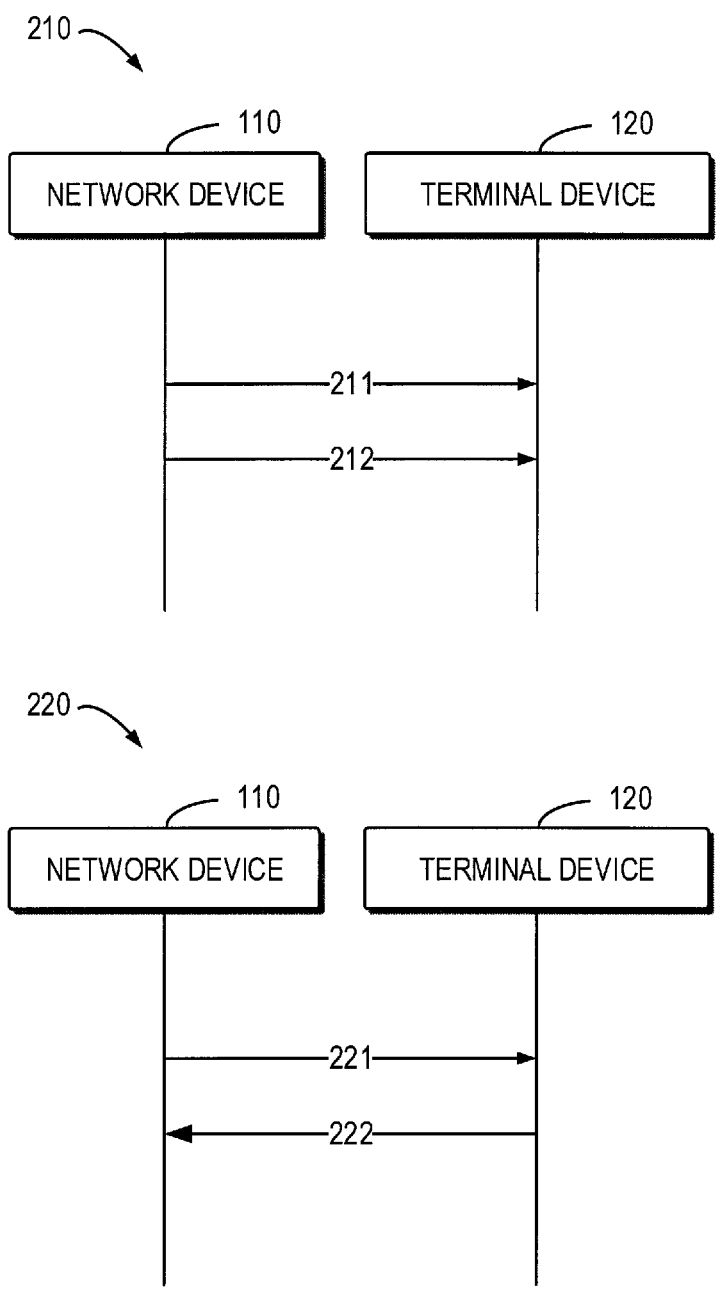
FIG. 2 illustrates processes for RS transmission according to some embodiments of the present disclosure.

Principle and implementations of the present disclosure will be described in detail below with reference to FIGS. 2-11, in which FIG. 2 shows two processes 210 and 220 for RS transmission according to some embodiments of the present disclosure. For the purpose of discussion, the processes 210 and 220 will be described with reference to FIG. 1. The processes 210 and 220 may involve the network device 110 and one or more terminal devices 120 served by the network device 110.

As shown in FIG. 2, the process 210 is directed to the case of downlink RS transmission. In one embodiment, the network device 110 may indicate (211) a RS configuration to a terminal device 120. The network device 120 may transmit (212) a RS based on the RS configuration. The terminal device 120 may receive the RS configuration from the network device 110, and detect the RS based on the received RS configuration. In one embodiment, the RS configuration may include at least one of the following: a RS pattern, RS port index(s), the number of symbols for RS, the number of CWs and/or transport blocks, the number of transmission layers, the number of RS ports, the number of PDCCHs, the number of Physical Downlink Shared Channels (PDSCHs), the maximum number of CWs and/or transport blocks, the maximum number of transmission layers, the maximum number of RS ports, the maximum number of PDCCHs, the maximum number of PDSCHs and so on. In another embodiment, the RS configuration may depend on a report from the terminal device 120. For example, the report may indicate the capability of the terminal device 120 about at least one of the following: the number of RS ports, the number of transmission layers, the number of CWs and/or transport blocks, the number of PDCCHs, the number of PDSCHs and so on.

As shown in FIG. 2, the process 220 is directed to the case of uplink RS transmission. In another embodiment, the network device 110 may indicate (221) a RS configuration to the terminal device 120. The terminal device 120 may receive from the network device 110 the RS configuration, and may transmit (222) the RS based on the received RS configuration. The network device 110 may detect the RS based on the RS configuration. In one embodiment, the RS configuration may include at least one of the following: a RS pattern, RS port index(s), the number of symbols for RS, the number of CWs and/or transport blocks, the number of transmission layers, the number of RS ports, the number of PDCCHs, the number of PDSCHs, the maximum number of CWs and/or transport blocks, the maximum number of transmission layers, the maximum number of RS ports, the maximum number of PDCCHs, the maximum number of PDSCHs and so on. In another embodiment, the RS configuration may depend on a report from the terminal device 120. For example, the report may indicate the capability of the terminal device 120 about at least one of the following: the number of RS ports, the number of transmission layers, the number of CWs and/or transport blocks, the number of PDCCHs, the number of PDSCHs and so on.

In one embodiment, a set of RS configurations may be determined for RS transmission. One or more RS configurations selected from the set of RS configurations may be configured for a terminal device 120 by the network device 110. In one embodiment, the terminal device 120 may detect or transmit the RS based on the configured one or more RS configurations.

In one embodiment, a set of RS ports may be determined for RS transmission. For example, the set of RS ports may be represented by $(A_1, A_2, A_3, A_4 \ldots, A_{R-1}, A_R)$, where R is an integer and R≥1, and $A_i$ (i∈(1, 2, ... R)) represents an index of a RS port. In one embodiment, one or more ports selected from the set of RS ports may be configured for a terminal device 120. In one embodiment, for example, $K_1$ RS ports (where $K_1$ is an integer and $1 \leq K_1 \leq R$) selected from the set of RS ports may be configured for the terminal device 120-1. In another embodiment, $K_2$ RS ports (where $K_2$ is an integer and 1≤$K_2$≤R) selected from the set of RS ports may be configured for the terminal device 120-2. In one embodiment, the number of RS ports configured for one terminal device may be different from that for another terminal device. That is, $K_1$ may be different from $K_2$. In one embodiment, the port indices configured for one terminal device may be different from those configured for another terminal device. That is, the port indices of the $K_1$ ports for the terminal device 120-1 may be different from those of the $K_2$ ports for the terminal device 120-2. In another embodiment, the $K_1$ ports for the terminal device 120-1 and the $K_2$ ports for the terminal device 120-2 may be at least partially overlapped or separated from each other. In another embodiment, the port indices of the RS ports selected from the set of RS ports may be contiguous or discontinuous.

Figure 3:
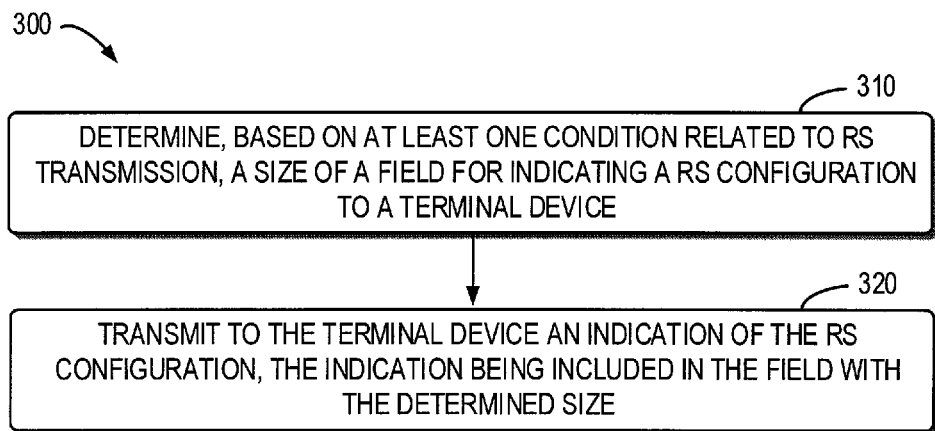
FIG. 3 shows a flowchart of an example method according to some embodiments of the present disclosure.

FIG. 3 shows a flowchart of an example method 300 for RS configuration according to some embodiments of the present disclosure. The method 300 can be implemented at the network device 110 as shown in FIG. 1. For the purpose of discussion, the method 300 will be described from the perspective of the network device 110 with reference to FIG. 1.

In act 310, the network device 110 determines, based on at least one condition related to RS transmission, the size of a field for indicating a RS configuration to a terminal device 120 served by the network device 110. In some embodiments, the network device 110 may determine, based on the at least one condition, one or more possible RS configurations for RS transmission, and then determine the size of the field based on the number of the one or more possible RS configurations. Then, in act 320, the network device 110 transmits to the terminal device 120 an indication of the RS configuration. In some embodiments, the indication may comprise an index value of the RS configuration. In some embodiments, the network device 110 may include the indication of the RS configuration in the field in DCI, and then transmit the DCI to the terminal device 120 via PDCCH.

In some embodiments, prior to determining the size of the field, the network device 110 may obtain the at least one condition, and indicate the at least one condition to the terminal device 120. For example, in one embodiment, the network device 110 may indicate the at least one condition to the terminal device 120 via higher layer signaling, such as signaling on Radio Resource Control (RRC) Layer, Medium Access Control (MAC) layer and so on. In this way, the terminal device 120 can determine the size of the field based the at least one condition in the same way as the network device 110.

In some embodiments, the at least one condition related to RS transmission may comprise at least one of the following: a RS configuration pattern, the number of CWs and/or transport blocks, the number of transmission layers, the number of symbols for RS, the number of PDCCHs, the number of PDSCHs, the maximum number of CWs and/or transport blocks, the maximum number of transmission layers, the maximum number of PDCCHs, the maximum number of PDSCHs and so on. In one embodiment, the number of CWs and/or transport blocks may be dependent on the number of transmission layers to be used for RS transmission. For example, if the number of transmission layers is not greater than 4, only one CW and/or transport block may be supported. If the number of transmission layers is greater than 4, two CWs and/or transport blocks may be supported.

In one embodiment, the network device 110 may determine M possible RS configurations for RS transmission based on a first condition, where M is an integer and M≥1. For example, the first condition may indicate that only one CW is enabled for RS transmission. Therefore, the number of bits of the field in DCI for indicating the DMRS configuration may be determined to be P, where P=ceil ($\log_2$(M)) or $\log_2$(M). In another embodiment, the network device 110 may determine N possible RS configurations for RS transmission based on a second condition, where N is an integer and N≥1. For example, the second condition may indicate that two CWs are enabled for RS transmission. Therefore, the number of bits of the field in DCI for indicating the DMRS configuration may be determined to be Q, where Q=ceil ($\log_2$(N)) or $\log_2$(N). In some embodiments, the value of M may be different from that of N, for example, M>N. Therefore, the value of P may be different from that of Q, for example, P>Q.

In one embodiment, in the case of only one CW, the possible DMRS configurations may cover 1 to 4 RS transmission layers. For example, there may be $a_1$ possible DMRS configurations associated with 1 RS transmission layer (also called "1-layer configurations"), $a_2$ possible DMRS configurations associated with 2 RS transmission layers (also called "2-layer configurations"), $a_3$ possible DMRS configurations associated with 3 RS transmission layers (also called "3-layer configurations") and $a_4$ possible DMRS configurations associated with 4 RS transmission layers (also called "4-layer configurations"), where $a_1$, $a_2$, $a_3$ and $a_4$ may be non-negative integers and independent from each other. That is, the values of $a_1$, $a_2$, $a_3$ and $a_4$ may be different from or same with each other. In this case, the number of possible DMRS configurations for one CW may be ($a_1+a_2+a_3+a_4$). FIG. 4 shows examples of the possible DMRS configurations for different numbers of CWs. In FIG. 4, table 410 is shown to include the ($a_1+a_2+a_3+a_4$) possible DMRS configurations for one CW. Each of the ($a_1+a_2+a_3+a_4$) possible DMRS configurations is indexed by a respective index value. The number of bits of the field in DCI for indicating the DMRS configuration may be thus determined to be ceil ($\log_2(a_1+a_2+a_3+a_4)$). In one embodiment, in case that DMRS is configured with up to 2 transmission layers, there may be no 3-layer or 4-layer DMRS configuration for one CW. That is, at least one of values of $a_3$ and $a_4$ may be zero.

In another embodiment, in the case of two CWs, the possible DMRS configurations may cover 5 to 8 RS transmission layers. For example, there may be $b_1$ possible DMRS configurations associated with 5 RS transmission layers (also called "5-layer configurations"), $b_2$ possible DMRS configurations associated with 6 RS transmission layers (also called "6-layer configurations"), $b_3$ possible DMRS configurations associated with 7 RS transmission layers (also called "7-layer configurations") and $a_4$ possible DMRS configurations associated with 8 RS transmission layers (also called "8-layer configurations"), where $b_1$, $b_2$, $b_3$ and $b_4$ may be non-negative integers and independent from each other. That is, the values of $b_1$, $b_2$, $b_3$ and $b_4$ may be different from or same with each other. In this case, the number of possible DMRS configurations for two CWs may be ($b_1+b_2+b_3+b_4$). As shown in FIG. 4, table 420 is shown to include the ($b_1+b_2+b_3+b_4$) possible DMRS configurations for two CWs. Each of the ($b_1+b_2+b_3+b_4$) possible DMRS configurations is indexed by a respective index value. The number of bits of the field in DCI for indicating the DMRS configuration may be thus determined to be: ceil ($\log_2(b_1+b_2+b_3+b_4)$). In one embodiment, in case that DMRS is configured with up to 6 transmission layers, there may be no 7-layer or 8-layer DMRS configuration for two CWs. That is, at least one of values of $b_3$ and $b_4$ may be zero.

In some embodiments the size of the field in DCI for indicating the DMRS configuration may be determined based on the maximum number of possible DMRS configurations for 1 CW and 2 CWs. For example, the size of the field may be: maximum (ceil ($\log_2(a_1+a_2+a_3+a_4)$)), ceil ($\log_2(b_1+b_2+b_3+b_4)$))).

In some embodiments, the size of the field in DCI for indicating the DMRS configuration may be determined based on different configuration patterns and/or different number of CWs.

As described above, two configuration patterns for DMRS have been designed and agreed in 3 GPP specification works (RAN1#89), each of which may support up to 8 or 12 orthogonal DMRS ports. One is referred to as Interleaved Frequency Division Multiplexing (IFDM) based configuration pattern (that is, Front-load DMRS Configuration 1 as agreed in RAN1#89), in which the DMRS ports may be multiplexed based on different Comb and/or cyclic shifts and/or TD-OCC, and it will be also referred to as "DMRS Configuration 1" in the following description. The other is referred to as Frequency Division-Orthogonal Covering Code (FD-OCC) based configuration pattern with adjacent REs in the frequency domain (that is, Front-load DMRS Configuration 2 as agreed in RAN1#89), in which the DMRS ports may be multiplexed based on FDM and/or FD-OCC and/or TDM and/or TD-OCC, and it will be also referred to as "DMRS Configuration 2" in the following description.

In some embodiments, in the case of DMRS Configuration 1, up to 8 DMRS ports may be supported. That is, up to 8 transmission layers are supported for DMRS Configuration 1. The number of bits of the field in DCI for indicating the DMRS configuration may be determined to be I, where I is an integer and I≥1. In one embodiment, the number of indices included in the field of DCI for indicating the DMRS configuration may be determined to be U, where U is an integer and U≥1. In other embodiments, in the case of DMRS Configuration 2, up to 12 DMRS ports may be supported. That is, up to 12 transmission layers are supported for DMRS Configuration 2. The number of bits of the field in DCI for indicating the DMRS configuration may be determined to be J, where J is an integer and J≥1. In one embodiment, the number of indices included in the field of DCI for indicating the DMRS configuration may be determined to V, where V is an integer and V≥1. In one embodiment, the value of I may be different from the value of J In another embodiment, the value of U may be different from the value of V.

In one embodiment, in the case of DMRS Configuration 1 and only one CW, the number of possible DMRS configurations may be 16, and thus the number of bits of the field in DCI for indicating the DMRS configuration may be determined to be 4. In another embodiment, in the case of DMRS Configuration 1 and two CWs, the number of possible DMRS configurations may be 4, and thus the number of bits of the field in DCI for indicating the DMRS configuration may be determined to be 2. FIG. 5A shows examples of such embodiments. In FIG. 5A, table 510 is shown to include the 16 possible DMRS configurations for one CW, and table 520 is shown to include the 4 possible DMRS configurations associated with two CWs.

In one embodiment, in the case of DMRS Configuration 2 and only one CW, the number of possible DMRS configurations may be 25, and thus the number of bits of the field in DCI for indicating the DMRS configuration may be determined to be 5. In another embodiment, in the case of DMRS Configuration 2 and two CWs, the number of possible DMRS configurations may be 5, and thus the number of bits of the field in DCI for indicating the DMRS configuration may be determined to be 3. FIG. 5B shows examples of such embodiments. In FIG. 5B, table 530 is shown to include the 25 possible DMRS configurations for one CW, and table 540 is shown to include the 5 possible DMRS configurations for two CWs.

In some embodiments, the size of the field in DCI for indicating the DMRS configuration may be determined based on different configuration patterns and/or different number of symbols to be used for RS transmission.

In one embodiment, in the case of DMRS Configuration 1 and one symbol, up to 4 transmission layers are supported. In one embodiment, the number of bits of the field in DCI for indicating the DMRS configuration may be determined to be $I_1$, where $I_1$ is an integer and $I_1 \geq 1$. In another embodiment, the number of indices included in the field of DCI for indicating the DMRS configuration may be determined to be $I_1$, where $I_1$ is an integer and $U_1 \geq 1$. In another embodiment, in the case of DMRS Configuration 1 and two symbols, up to 8 transmission layers are supported. In one embodiment, the number of bits of the field in DCI for indicating the DMRS configuration may be determined to be $I_2$, where $I_2$ is an integer and $I_2 \geq 1$. In one embodiment, the number of indices included in the field of DCI for indicating the DMRS configuration may be determined to $U_2$, where $U_2$ is an integer and $U_2 \geq 1$. In one embodiment, the value of $I_1$ may be different from the value of $I_2$. In another embodiment, the value of $U_1$ may be different from the value of $U_2$.

In one embodiment, in the case of DMRS Configuration 2 and one symbol, up to 6 or 4 or 2 transmission layers may be supported. In one embodiment, the number of bits of the field in DCI for indicating the DMRS configuration may be determined to be $J_1$, where $J_1$ is an integer and $J_1 \geq 1$. In another embodiment, the number of indices included in the field of DCI for indicating the DMRS configuration may be determined to $V_1$, where $V_1$ is an integer and $V_1 \geq 1$. In another embodiment, in the case of DMRS Configuration 2 and two symbols, up to 12 transmission layers are supported. In one embodiment, the number of bits of the field in DCI for indicating the DMRS configuration may be determined to be $J_2$, where $J_2$ is an integer and $J_2 \geq 1$. In another embodiment, the number of indices included in the field of DCI for indicating the DMRS configuration may be determined to $V_2$, where $V_2$ is an integer and $V_2 \geq 1$. In one embodiment, the value of $J_1$ may be different from the value of $J_2$. In another embodiment, the value of $V_1$ may be different from the value of $V_2$.

In some embodiments, different sizes of the field in DCI for indicating the DMRS configuration may be determined based on at least one of the following: different numbers of CWs and/or transport blocks, different numbers of transmission layers, different numbers of symbols for RS, different numbers of PDCCHs, different numbers of PDSCHs, different maximum numbers of CWs and/or transport blocks, different maximum numbers of transmission layers, different maximum numbers of PDCCHs, different maximum numbers of PDSCHs and so on. For example, in different cases, the table of possible DMRS configurations may be different, e.g. including different configurations and/or numbers of indices, and thus the size of the field in DCI for indicating the DMRS configuration may be different.

In one embodiment, suppose that the size of the field in DCI for indicating the DMRS configuration may be determined based on a number X, where X may indicate one of the following: the number of CWs and/or transport blocks, the number of transmission layers, the number of symbols for RS, the number of PDCCHs, the number of PDSCHs, the maximum number of CWs and/or transport blocks, the maximum number of transmission layers, the maximum number of PDCCHs, the maximum number of PDSCHs and so on. In one embodiment, in this case, the number of bits of the field in DCI for indicating the DMRS configuration may be determined to be $I_3$, where $I_3$ is an integer and $I_3 \geq 1$. In one embodiment, the number of indices included in the field of DCI for indicating the DMRS configuration may be determined to $U_3$, where $U_3$ is an integer and $U_3 \geq 1$.

In another embodiment, suppose that the size of the field in DCI for indicating the DMRS configuration may be determined based on a number Y, where Y may indicate one of the following: the number of CWs and/or transport blocks, the number of transmission layers, the number of symbols for RS, the number of PDCCHs, the number of PDSCHs, the maximum number of CWs and/or transport blocks, the maximum number of transmission layers, the maximum number of PDCCHs, the maximum number of PDSCHs and so on. For example, the value of Y may be different from that of X. In one embodiment, in this case, the number of bits of the field in DCI for indicating the DMRS configuration may be determined to be $I_4$, where $I_4$ is an integer and $I_4 \geq 1$. In one embodiment, the number of indices included in the field of DCI for indicating the DMRS configuration may be determined to $U_4$, where $U_4$ is an integer and $U_4 \geq 1$. In one embodiment, the value of $I_3$ may be different from the value of $I_4$. In another embodiment, the value of $U_3$ may be different from the value of $U_4$.

In some embodiments, if only one CW is enabled for DMRS transmission, the size of the field for indicating the DMRS configuration may be determined to be ceil ($\log_2 (a_1+a_2+a_3+a_4)$), where $a_1$ represents the number of possible 1-layer configurations, $a_2$ represents the number of possible 2-layer configurations, $a_3$ represents the number of possible 3-layer configurations and $a_4$ represents the number of possible 4-layer configurations respectively. $a_1$, $a_2$, $a_3$ and $a_4$ may be non-negative integers and independent from each other.

In some embodiments, if both one CW and two CWs are enabled for DMRS transmission, the number of possible DMRS configurations may be max (($a_{11}+a_{21}+a_{31}+a_{41}$), ($b_1+b_2+b_3+b_4$)), where $a_{11}$ represents the number of possible 1-layer configurations, $a_{21}$ represents the number of possible 2-layer configurations, $a_{31}$ represents the number of possible 3-layer configurations, $a_{41}$ represents the number of possible 4-layer configurations, $b_1$ represents the number of possible 5-layer configurations, $b_2$ represents the number of possible 6-layer configurations, $b_3$ represents the number of possible 7-layer configurations and $b_4$ represents the number of possible 4-layer configurations. $b_1$, $b_2$, $b_3$, $b_4$, $a_{11}$, $a_{21}$, $a_{31}$ and $a_{41}$ may be non-negative integers and independent from each other. In this case, the size of the field for indicating the DMRS configuration may be determined to be ceil ($\log_2$ (max (($a_{11}+a_{21}+a_{31}+a_{41}$), ($b_1+b_2+b_3+b_4$)))). FIG. 6A shows an example of such embodiments. In FIG. 6A, table 610 is shown to include 25 possible DMRS configurations for one CW and 5 possible DMRS configurations for two CWs. Each of the 25 possible DMRS configurations for one CW and the 5 possible DMRS configurations for two CWs is associated with a respective index value. Some index values associated with two CWs are overlapped with some index values associated with one CW. In the example as shown in FIG. 6A, the size of the field for indicating the DMRS configuration may be determined to be 5.

The value of ($a_{11}+a_{21}+a_{31}+a_{41}$) may be greater than the value of ($b_1+b_2+b_3+b_4$), for example, as shown in FIG. 6A. In one embodiment, to further reduce the overhead for indicating the RS configuration, some unused index values associated with two CWs may be used to index some possible DMRS configurations for one CW. FIG. 6B shows an example of such embodiments. As shown in table 620 of FIG. 6B, unused index values '6'-'14' associated with two CWs are used to index the possible DMRS configurations for one CW, which are originally indexed by index values '16'-'24'.

In some embodiments, in case that the number for determining the size of the field in DCI for indicating the DMRS configuration is X, the number of possible DMRS configurations for one CW may be determined to be ($a_{13}+a_{23}+a_{33}+a_{43}$), where $a_{13}$ represents the number of possible 1-layer configurations, $a_{23}$ represents the number of possible 2-layer configurations, $a_{33}$ represents the number of possible 3-layer configurations and $a_{43}$ represents the number of possible 4-layer configurations respectively. $a_{13}$, $a_{23}$, $a_{33}$ and $a_{43}$ may be non-negative integers and independent from each other. In some embodiments, in case that the number for determining the size of the field in DCI for indicating the DMRS configuration is Y, the number of indices for indicating possible DMRS configurations for one CW may be determined to be ($a_{14}+a_{24}+a_{34}+a_{44}$), where $a_{14}$ represents the number of possible 1-layer configurations, $a_{24}$ represents the number of possible 2-layer configurations, $a_{34}$ represents the number of possible 3-layer configurations and $a_{44}$ represents the number of possible 4-layer configurations respectively. $a_{14}$, $a_{24}$, $a_{34}$ and $a_{44}$ may be non-negative integers and independent from each other. In one embodiment, the value of X may be different from that of Y. In this case, at least one of the numbers of possible 1-layer, 2-layer, 3-layer and 4-layer configurations associated with X may be different from that associated with Y. For example, the value of $a_{13}$ may be different from that of $a_{14}$. Alternatively or in addition, the value of $a_{23}$ may be different from that of $a_{24}$. Alternatively or in addition, the value of $a_{33}$ may be different from that of $a_{34}$. Alternatively or in addition, the value of $a_{43}$ may be different from that of $a_{44}$.

In some embodiments, in case that the number for determining the size of the field in DCI for indicating the DMRS configuration is X, the number of possible DMRS configurations for two CWs may be determined to be ($b_{13}+b_{23}+b_{33}+b_{43}$), where $b_{13}$ represents the number of possible 5-layer configurations, $b_{23}$ represents the number of possible 6-layer configurations, $b_{33}$ represent the number of possible 7-layer configurations and $b_{43}$ represents the number of possible 8-layer configurations respectively. $b_{13}$, $b_{23}$, $b_{33}$ and $b_{43}$ may be non-negative integers and independent from each other. In some embodiments, in case that the number for determining the size of the field in DCI for indicating the DMRS configuration is Y, the number of possible DMRS configuration for two CWs may be determined to be ($b_{14}+b_{24}+b_{34}+b_{44}$), where $b_{14}$ represents the number of possible 5-layer configurations, $b_{24}$ represents the number of possible 6-layer configurations, $b_{34}$ represents the number of possible 7-layer configurations and $b_{44}$ represents the number of possible 8-layer configurations respectively. $b_{14}$, $b_{24}$, $b_{34}$ and $b_{44}$ may be non-negative integers and independent from each other. In one embodiment, the value of X may be different from that of Y. In this case, at least one of the numbers of possible 5-layer, 6-layer, 7-layer and 8-layer configurations associated with X may be different from that associated with Y. For example, the value of $b_{13}$ may be different from that of $b_{14}$. Alternatively or in addition, the value of $b_{23}$ may be different from that of $b_{24}$. Alternatively or in addition, the value of $b_{33}$ may be different from that of $b_{34}$. Alternatively or in addition, the value of $b_{43}$ may be different from that of $b_{44}$.

In one embodiment, an additional field in DCI can be used to indicate whether an index value is associated with one CW or two CWs. For example, if only one CW is enabled, one set of MCS/NDI/RV in DCI may be unused. In one embodiment, the unused field of New Data Indicator (NDI) for two CWs may be reused to indicate whether an index value is associated with one CW or two CWs. For example, for an index value between '6' and '14', if the NDI equals to 0, it may indicate that the index value is associated with one CW; if the NDI equals to 1, it may indicate that the index value is associated with two CWs. In the example as shown in FIG. 6B, the size of the field for indicating the DMRS configuration may be determined to be 4, which is less than 5 as shown in FIG. 6A.

In some embodiment, the size of the field for indicating the DMRS configuration may also be determined based on different conditions related to RS retransmission.

Suppose that the possible RS configurations for two CWs are associated with 5 transmission layers, 6 transmission layers, 7 transmission layers or 8 transmission layers. Taking a 5-layer RS configuration as an example, 2 transmission layers may be used to transmit one CW, and 3 transmission layers may be used to transmit the other CW. Taking a 6-layer RS configuration as an example, 3 transmission layers may be used to transmit one CW, and 3 transmission layers may be used to transmit the other CW. Taking a 7-layer RS configuration as an example, 3 transmission layers may be used to transmit one CW, and 4 transmission layers may be used to transmit the other CW. Taking an 8-layer RS configuration as an example, 4 transmission layers may be used to transmit one CW, and 4 transmission layers may be used to transmit the other CW. If the transmission of one of the two CWs fails, the failed CW will need to be retransmitted. To meet the requirements of accordant retransmission, at least 2 transmission layers may be used for the retransmission.

In some embodiment, two CWs may be enabled for the retransmission. That is, one CW may be used for transmission of new data, while the other CW may be used for retransmission of the failed CW. In this case, the following DCI may still contain two sets of MCS/NDI/RV. The size of the field for indicating the DMRS configuration in the following DCI may be determined based on the number of possible DMRS configurations for two CWs, as described above.

Figure 7:
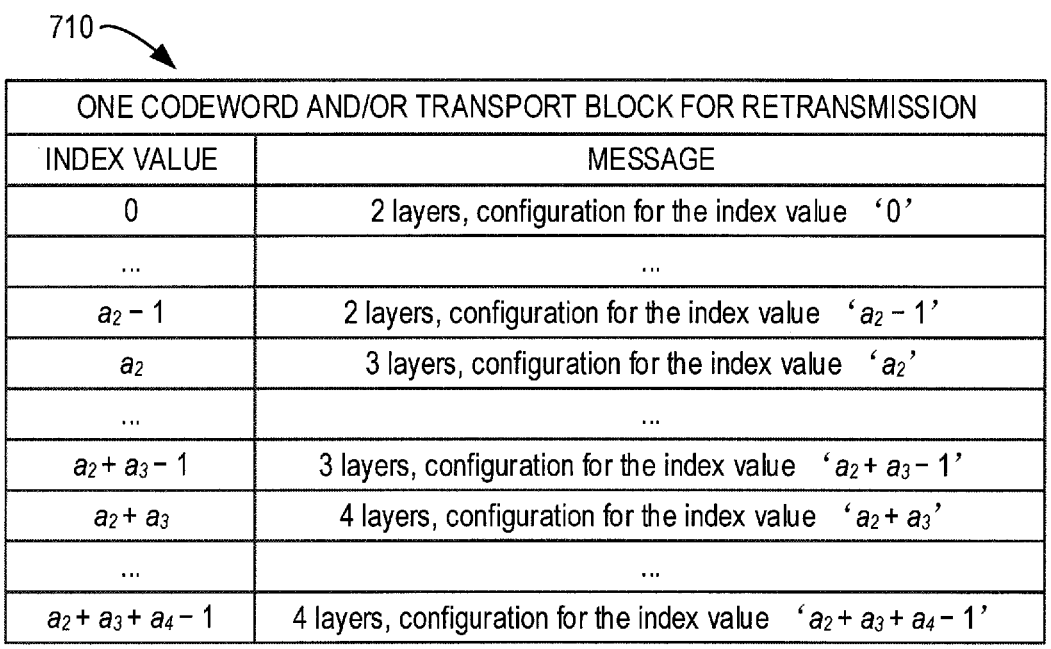
FIG. 7 shows examples of possible DMRS configurations according to some embodiments of the present disclosure.

In some other embodiments, only one CW may be enabled for the retransmission. That is, only one CW may be used for retransmission of the failed CW. In this case, the following DCI may still contain two sets of MCS/NDI/RV, where one of the two sets of MCS/NDI/RV may be enabled and the other of the two sets of MCS/NDI/RV may be disabled. As described above, at least 2 transmission layers will be used for the retransmission of the failed CW. Therefore, 1-layer RS configurations will not be used for the retransmission of the failed CW. In one embodiment, the number of possible 1-layer RS configurations can be subtracted from the total number of possible RS configurations for one CW. In this way, the payload size of the following DCI can be further reduced. FIG. 7 shows an example table 710 of such embodiments. In table 710, the 1-layer RS configurations are omitted from table 410 as shown in FIG. 4.

Figure 8:
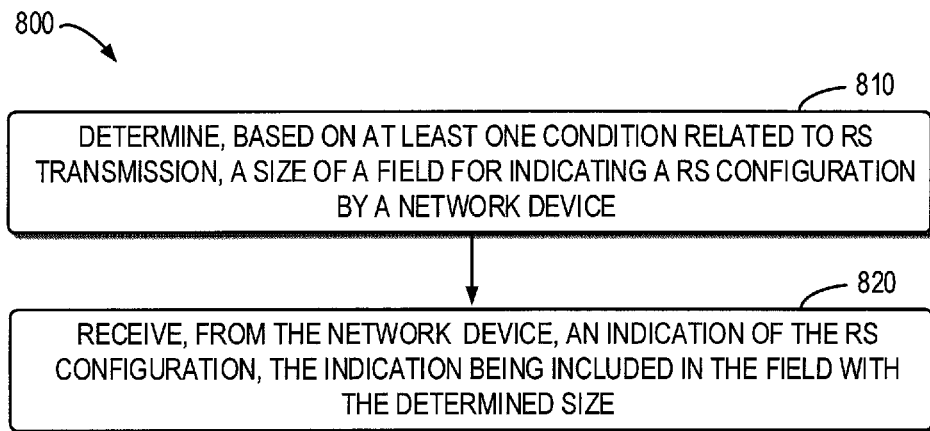
FIG. 8 shows a flowchart of an example method in accordance with some embodiments of the present disclosure.

FIG. 8 shows a flowchart of an example method 800 in accordance with some embodiments of the present disclosure. The method 800 can be implemented at a terminal device 120 as shown in FIG. 1. For the purpose of discussion, the method 800 will be described from the perspective of the terminal device 120 with reference to FIG. 1.

In act 810, the terminal device 120 determines, based on at least one condition related to RS transmission, the size of a field for indicating a RS configuration by a network device serving the terminal device 120.

In some embodiments, prior to determining the size of the field, the terminal device 120 may receive from the network device 110 an indication of the at least one condition. For example, in one embodiment, the terminal device 120 may receive the indication of the at least one condition via higher layer signaling, such as signaling on Radio Resource Control (RRC) Layer, Medium Access Control (MAC) layer and so on.

In some embodiments, the at least one condition comprises at least one of the following: a RS configuration pattern, the number of CWs and/or transport blocks, the number of transmission layers, the number of symbols, the number of PDCCHs, the number of PDSCHs, the maximum number of CWs and/or transport blocks, the maximum number of transmission layers, the maximum number of RS ports, the maximum number of PDCCHs and the maximum number of PDSCHs, to be used for RS transmission.

In some embodiments, the terminal device 120 may determine the size of the field in the same way as the network device 110, as described above. For the purpose of simplification, the determining of the size of the field by the terminal device 120 will not be further described in detail.

In act 820, the terminal device 120 receives, from the network device, an indication of the RS configuration, the indication being included in the field with the determined size.

In some embodiments, the indication may comprise an index value of the RS configuration. In some embodiments, the RS configuration comprises information on at least one of the following: one or more RS ports, scrambling identity, the number of RS transmission layers and a RS configuration pattern associated with the RS configuration.

In some embodiments, the terminal device 120 may receive DCI including the field from the network device, the indication of the RS configuration being included in the field in DCI.

In some embodiments, the RS may include a demodulation reference signal (DMRS).

Figure 9:
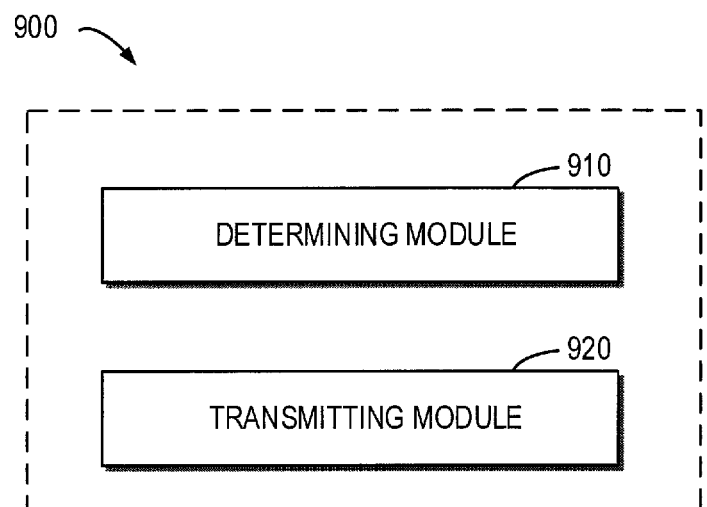
FIG. 9 is a block diagram of a network device in accordance with some embodiments of the present disclosure.

FIG. 9 shows a block diagram of an apparatus 900 in accordance with some embodiments of the present disclosure. The apparatus 900 can be considered as an example implementation of the network device 110 as shown in FIG. 1. As shown, the apparatus 900 includes a determining module 910 configured to determine, based on at least one condition related to reference signal (RS) transmission, the size of a field for indicating a RS configuration to a terminal device served by the network device. The apparatus 900 also includes a transmitting module 920 configured to transmit to the terminal device a first indication of the RS configuration, the first indication being included in the field with the determined size.

Figure 10:
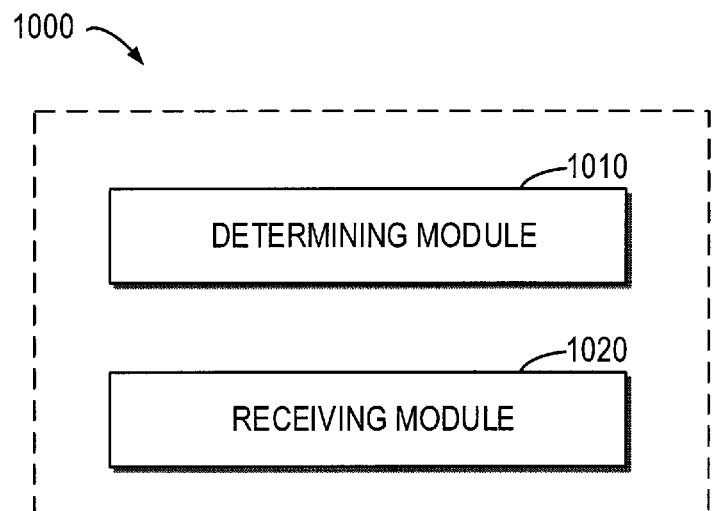
FIG. 10 is a block diagram of a terminal device in accordance with some embodiments of the present disclosure.

FIG. 10 shows a block diagram of an apparatus 1000 in accordance with some embodiments of the present disclosure. The apparatus 1000 can be considered as an example implementation of the terminal device 120 as shown in FIG. 1. As shown, the apparatus 1000 includes a determining module 1010 configured to determine, based on at least one condition related to reference signal (RS) transmission, the size of a field for indicating a RS configuration by a network device serving the terminal device. The apparatus 1000 also includes a receiving module 1020 configured to receive, from the network device, a first indication of the RS configuration, the first indication being included in the field with the determined size.

For the sake of clarity, FIGS. 9 and/or 10 do not illustrate some optional modules of the apparatuses 900 and/or 1000. However, it should be understood that various features as described with reference to FIGS. 1-8 are likewise applicable to the apparatuses 900 and/or 1000. Moreover, respective modules of the apparatuses 900 and/or 1000 may be hardware modules or software modules. For example, in some embodiments, the apparatuses 900 and/or 1000 may be implemented partially or completely by software and/or firmware, e.g., implemented as a computer program product embodied on the computer-readable medium. Alternatively, or in addition, the apparatuses 900 and/or 1000 may be partially or completely implemented based on hardware, e.g., implemented as an integrated circuit (IC), an application-specific integrated circuit (ASIC), a system on chip (SOC), a field programmable gate array (FPGA) and the like. The scope of the present disclosure is not limited in this aspect.

Figure 11:
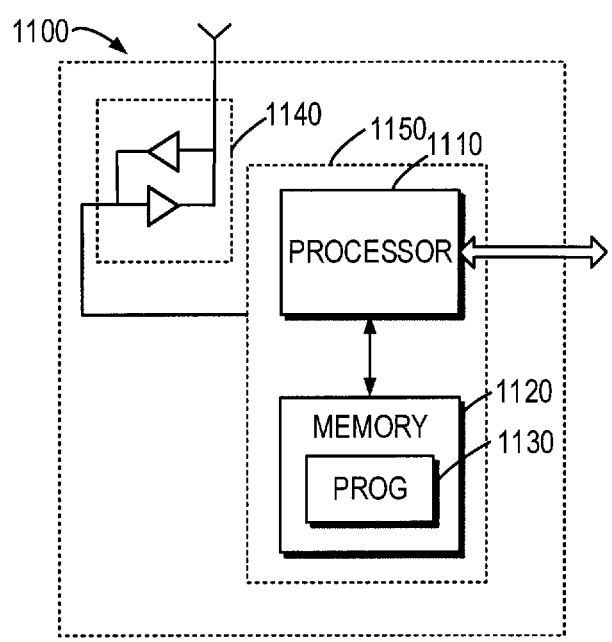
FIG. 11 is a simplified block diagram of a device that is suitable for implementing embodiments of the present disclosure.

FIG. 11 is a simplified block diagram of a device 1100 that is suitable for implementing embodiments of the present disclosure. The device 1100 can be considered as a further example implementation of a network device 110 or a terminal device 120 as shown in FIG. 1. Accordingly, the device 1100 can be implemented at or as at least a part of the network device 110 or the terminal device 120.

As shown, the device 1100 includes a processor 1110, a memory 1120 coupled to the processor 1110, a suitable transmitter (TX) and receiver (RX) 1140 coupled to the processor 1110, and a communication interface coupled to the TX/RX 1140. The memory 1110 stores at least a part of a program 1130. The TX/RX 1140 is for bidirectional communications. The TX/RX 1140 has at least one antenna to facilitate communication, though in practice an Access Node mentioned in this application may have several ones. The communication interface may represent any interface that is necessary for communication with other network elements, such as X2 interface for bidirectional communications between eNBs, S1 interface for communication between a Mobility Management Entity (MME)/Serving Gateway (S-GW) and the eNB, Un interface for communication between the eNB and a relay node (RN), or Uu interface for communication between the eNB and a terminal device.

The program 1130 is assumed to include program instructions that, when executed by the associated processor 1110, enable the device 1100 to operate in accordance with the embodiments of the present disclosure, as discussed herein with reference to FIGS. 1 to 8. The embodiments herein may be implemented by computer software executable by the processor 1110 of the device 1100, or by hardware, or by a combination of software and hardware. The processor 1110 may be configured to implement various embodiments of the present disclosure. Furthermore, a combination of the processor 1110 and memory 1110 may form processing means 1150 adapted to implement various embodiments of the present disclosure.

The memory 1110 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 1110 is shown in the device 1100, there may be several physically distinct memory modules in the device 1100. The processor 1110 may be of any type suitable to the local technical network, and may include one or more of general purpose computers, special purpose computers, microprocessors, digital signal processors (DSPs) and processors based on multicore processor architecture, as non-limiting examples. The device 1100 may have multiple processors, such as an application specific integrated circuit chip that is slaved in time to a clock which synchronizes the main processor.

Figure 12:
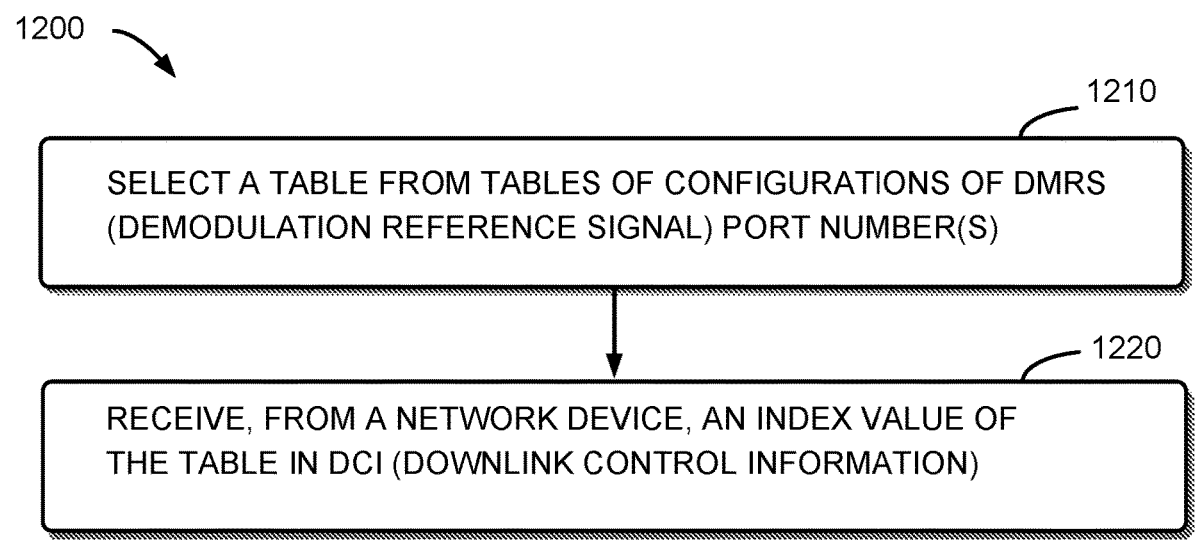
FIG. 12 shows a flowchart of a non-limiting example method in accordance with some embodiments of the disclosure.

FIG. 12 shows a flowchart of an example method 1200 in accordance with some embodiments of the present disclosure. The method 1200 can be implemented at a terminal device 120 as shown in FIG. 1. For the purpose of discussion, the method 1200 will be described from the perspective of the terminal device 120 with reference to FIG. 1.

In act 1210, the terminal device 120 selects a table from tables of configurations of DMRS (DeModulation Reference Signal) port number(s).

In act 1220, the terminal device 120 receives, from the network device, an index value of the table in DCI (Downlink Control Information).

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 1 to 11. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal comprising a processor configured to:
select a table from tables of configurations of DMRS (DeModulation Reference Signal) port number(s); and
receive, from a network device, an index value of the table in DCI (Downlink Control Information),
wherein the number of bits for index values of each of the tables differs depending on a combination of a 1st parameter and a 2nd parameter,
wherein the maximum number of DMRS ports being supported depends on the 1st parameter,
wherein the 2nd parameter is a parameter of the number of symbol(s) for DMRS, and
wherein the processor is configured to:
select the table, based on the 1st parameter and the 2nd parameter, from the tables.

2. The terminal according to claim 1, wherein the 1st parameter is one of DMRS Configuration 1 and DMRS Configuration 2,
wherein up to 4 transmission layers are supported for the DMRS Configuration 1 if the 2nd parameter indicates 1 symbol,
wherein up to 8 transmission layers are supported for the DMRS Configuration 1 if the 2nd parameter indicates 2 symbols,
wherein up to 6 transmission layers are supported for the DMRS Configuration 2 if the 2nd parameter indicates 1 symbol, and
wherein up to 12 transmission layers are supported for the DMRS Configuration 2 if the 2nd parameter indicates 2 symbols.

3. The terminal according to claim 1, wherein the processor is configured to:
receive, from the network device, the 1st parameter and the 2nd parameter via RRC (Radio Resource Control) layer signaling.

4. The terminal according to claim 1, wherein the processor is configured to:
receive, from the network device, a DMRS based on a configuration of DMRS port number(s) indexed by the index value.

5. The terminal according to claim 1, wherein the processor is configured to:
transmit, to the network device, a DMRS based on a configuration of DMRS port number(s) indexed by the index value.

6. A network device comprising a processor configured to:
select a table from tables of configurations of DMRS (DeModulation Reference Signal) port number(s); and
transmit, to a terminal, an index value of the table in DCI (Downlink Control Information),
wherein the number of bits for index values of each of the tables differs depending on a combination of a 1st parameter and a 2nd parameter,
wherein the maximum number of DMRS ports being supported depends on the 1st parameter,
wherein the 2nd parameter is a parameter of the number of symbol(s) for DMRS, and
wherein the processor is configured to:
select the table, based on the 1st parameter and the 2nd parameter, from the tables.

7. The network device according to claim 6, wherein the 1st parameter is one of DMRS Configuration 1 and DMRS Configuration 2,
wherein up to 4 transmission layers are supported for the DMRS Configuration 1 if the 2nd parameter indicates 1 symbol,
wherein up to 8 transmission layers are supported for the DMRS Configuration 1 if the 2nd parameter indicates 2 symbols,
wherein up to 6 transmission layers are supported for the DMRS Configuration 2 if the 2nd parameter indicates 1 symbol, and
wherein up to 12 transmission layers are supported for the DMRS Configuration 2 if the 2nd parameter indicates 2 symbols.

8. The network device according to claim 6, wherein the processor is configured to:
transmit, to a terminal, the 1st parameter and the 2nd parameter via RRC (Radio Resource Control) layer signaling.

9. The network device according to claim 6, wherein the processor is configured to:
transmit, to a terminal, a DMRS based on a configuration of DMRS port number(s) indexed by the index value.

10. The network device according to claim 6, wherein the processor is configured to:
receive, from a terminal, a DMRS based on a configuration of DMRS port number(s) indexed by the index value.

11. A method comprising:
selecting a table from tables of configurations of DMRS (DeModulation Reference Signal) port number(s); and
receiving an index value of the table in DCI (Downlink Control Information),
wherein the number of bits for index values of each of the tables differs depending on a combination of a 1st parameter and a 2nd parameter,
wherein the maximum number of DMRS ports being supported depends on the 1st parameter,
wherein the 2nd parameter is a parameter of the number of symbol(s) for DMRS, and
wherein the method further comprises selecting the table, based on the 1st parameter and the 2nd parameter, from the tables.

12. The method according to claim 11, wherein the 1st parameter is one of DMRS Configuration 1 and DMRS Configuration 2,
wherein up to 4 transmission layers are supported for the DMRS Configuration 1 if the 2nd parameter indicates 1 symbol,
wherein up to 8 transmission layers are supported for the DMRS Configuration 1 if the 2nd parameter indicates 2 symbols,
wherein up to 6 transmission layers are supported for the DMRS Configuration 2 if the 2nd parameter indicates 1 symbol, and
wherein up to 12 transmission layers are supported for the DMRS Configuration 2 if the 2nd parameter indicates 2 symbols.

13. The method according to claim 11, comprising:
receiving the 1st parameter and the 2nd parameter via RRC (Radio Resource Control) layer signaling.

14. The method according to claim 11, comprising:
receiving a DMRS based on a configuration of DMRS port number(s) indexed by the index value.

15. The method according to claim 11, comprising:
transmitting a DMRS based on a configuration of DMRS port number(s) indexed by the index value.

16. A method comprising:
selecting a table from tables of configurations of DMRS (DeModulation Reference Signal) port number(s); and
transmitting an index value of the table in DCI (Downlink Control Information),
wherein the number of bits for index values of each of the tables differs depending on a combination of a 1st parameter and a 2nd parameter,
wherein the maximum number of DMRS ports being supported depends on the 1st parameter,
wherein the 2nd parameter is a parameter of the number of symbol(s) for DMRS, and
wherein the method further comprises selecting the table, based on the 1st parameter and the 2nd parameter, from the tables.

17. The method according to claim 16, wherein the 1st parameter is one of DMRS Configuration 1 and DMRS Configuration 2,
wherein up to 4 transmission layers are supported for the DMRS Configuration 1 if the 2nd parameter indicates 1 symbol,
wherein up to 8 transmission layers are supported for the DMRS Configuration 1 if the 2nd parameter indicates 2 symbols,
wherein up to 6 transmission layers are supported for the DMRS Configuration 2 if the 2nd parameter indicates 1 symbol, and
wherein up to 12 transmission layers are supported for the DMRS Configuration 2 if the 2nd parameter indicates 2 symbols.

18. The method according to claim 16, comprising:
transmitting the 1st parameter and the 2nd parameter via RRC (Radio Resource Control) layer signaling.

19. The method according to claim 16, comprising:
transmitting a DMRS based on a configuration of DMRS port number(s) indexed by the index value.

20. The method according to claim 16, comprising:
receiving a DMRS based on a configuration of DMRS port number(s) indexed by the index value.

* * * * *